3,231,601
PROCESS FOR THE CYANOETHYLATION OF
AROMATIC AMINES
Hans Jakob Peterli, Basel-Land, Switzerland, assignor to Geigy Chemical Corporation, Ardsley, N.Y., a corporation of Delaware
No Drawing. Filed Aug. 3, 1962, Ser. No. 214,514
Claims priority, application Switzerland, Aug. 4, 1961, 9,153/61
9 Claims. (Cl. 260—465)

The present invention concerns a process for the cyanoethylation of primary and secondary aromatic amines by reaction thereof with acrylonitrile.

That primary and secondary amines can be reacted with acrylonitrile to form the corresponding cyanoethylamines is known. In the aliphatic series, this reaction is performed extraordinarily simply: in this case it can be performed without the addition of catalysts. However, because of their weaker basicity, aromatic amines do not react at all well with acrylonitrile. To force a reaction, special catalysts and solvents must be used. Thus, for instance, the reaction of aniline derivatives with acrylonitrile in glacial acetic acid, if desired, with the addition of copper salts, is known. But in this reaction always mixtures of mono- and di-cyanoethyl derivatives are obtained. Also the cyanoethylation of aromatic amines in the presence of strongly basic catalysts such as the potassium salt of carbazole has been performed. This method is successful mainly with very weakly basic aniline derivatives, e.g. nitroanilines.

However, the known cyanoethylation processes for aromatic amines are not satisfactory technical manufacturing processes as expensive solvents and/or catalysts must be used and, in addition, non-uniform end products are obtained.

It has been found that primary and secondary aromatic amines can be cyanoethylated by reacting them with acrylonitrile to obtain good yields if the reaction is performed in aqueous medium, i.e. in water as the principal or sole solvent, and in the presence of the salts of these aromatic amines with strong acid as catalysts. One cyanoethyl group is introduced per amino group by this process.

Primary and secondary aromatic amines usable according to the invention are mainly those of the benzene and naphthalene series. Those aromatic amines the basicity of which is at least of the same order of magnitude as that of aniline, i.e. the pK value according to the definition $$pk = pH + \log\left(\frac{HA}{A}\right)$$

is almost the same or greater than the pK value of aniline are particularly suitable for the process according to the present invention. In the above equation, HA is the concentration of substituted aromatic ammonium ions and A is the concentration of the corresponding free aromatic amine.

Aromatic amines having smaller pK values than aniline are the less suitable for the process according to the invention the smaller the pK value is.

Thus, in addition to aniline, phenylenediamine and benzidine, those aromatic amines are the most suitable for the process according to the invention which contain hydrocarbon groups such as methyl or phenyl groups, hydroxyl groups, ether groups such as alkoxy, cycloalkoxy, aralkoxy or aryloxy groups or amino groups which latter may be substituted.

In addition to the basicity of the amines usable according to the invention, also the steric hindrance of the amino group in the reaction with acrylonitrile plays a part. Unwieldy groups in the o-position to the amino group or bound to the amino group itself reduce the reactivity of the corresponding amines. Thus primary amines in general react better than secondary amines of comparable basicity, and amines substituted in the o-position generally react better than o-substituted amines of comparable basicity. For example, N-methylaniline is less reactive than aniline and o-toluidine is less reactive than p-toluidine.

Examples of aromatic amines usable according to the invention are:

Aniline, o-, m- or p-methylaniline, o-, m- or p-ethylaniline, o-, m- or p-hydroxyaniline, p-propylaniline, p-isopropylaniline, p,n-, p-sec.-, or p-tert.- butylaniline, m,p-dimethylaniline, m,p-diethylaniline, p-cyclohexylaniline, p-benzylaniline, p-phenylaniline, o-, m- or p-methoxyaniline, o-, m- or p-ethoxyaniline, p-propoxyaniline, p-isopropoxyaniline, p-butoxyaniline, m,p-dimethoxyaniline, m,p-diethoxyaniline, p-cyclohexyloxyaniline, p-benzyloxyaniline, p-phenoxyaniline, p-phenylenediamine, p-acetylamidoaniline, p-formylamidoaniline, m-propionylamidoaniline, p-methylaminoaniline, p-ethylaminoaniline, p-propylaminoaniline, p-butylaminoaniline, p-dimethylaminoaniline, p-diethylaminoaniline, p-cyclohexylaminoaniline, p - benzylaminoaniline, p - phenylaminoaniline, benzidine, dianisidine, 4,4'-diaminodiphenylamine, 4,4'-diaminodiphenylether, 4,4'-diaminodiphenyl sulphide, 2-amino - 5,6,7,8 - tetrahydronaphthalene, 1-aminonaphthalene, 4-methyl-1-aminonaphthalene, 4-methoxy-1-aminonaphthalene, 5-hydroxy-1-aminonaphthalene, 5-aminoacenaphthalene, N-methyl-, N-ethyl-, N-propyl- or N-butylaniline, N-methyl- or N-ethyl-p-methylaniline, N-methyl- or N-ethyl p-methoxyaniline, N-2-hydroxyethylaniline, N-2-hydroxyethyl-p-methylaniline or N-2-hydroxyethyl-p-methoxyaniline.

The strong acids which are suitable for the formation of the amine salts according to the invention are mainly those which easily dissolve in water and dissociate completely therein, i.e. for example, mineral acids such as halogen hydracids, e.g. hydrochloric, hydrobromic or hydriodic acid or sulphuric acid or phosphoric acid, organic acids such as aryl sulphonic acids, e.g. benzene or p-toluene sulphonic acid or trifluoroacetic acid.

Hydrochloric acid and sulfuric acid are preferred for economic reasons and phosphoric acid is preferred for technical reasons (no corrosion).

Generally the reaction of the primary or secondary aromatic amine with acrylonitrile is performed by heating under reflux. The duration of the heating depends on the nature of the amine used and on its salts with the strong acid; as a rule it is from 2 to 48 hours. Less reactive amines, such as those sterically hindered aromatic amines mentioned above, e.g. o-toluidine or N-methylaniline are advantageously reacted at a raised temperature and under pressure. When amines which react slowly are used, the process according to the invention is performed advantageously in the presence of polymerisation inhibitors in order to prevent a polymerisation of the acrylonitrile. The usual compounds such as, e.g. hydroquinone, are used as polymerisation inhibitors. If water insoluble aromatic amines are used, then the reaction is advantageously performed in the presence of solubility promoters, e.g. of dispersing agents such as condensation products of alkyl phenols and ethylene oxide which can be mixed with the water serving as solvent in a sufficient amount but not more than 25% and preferably 0.1 to 10% by weight.

The molar ratio of the aromatic amine usable according to the invention to that of its salts with the strong acid varies between about 500:1 to 10:1, preferably 100:1 to 20:1.

Compared with the known cyanoethylation processes, the present method has the following advantages:

(a) No expensive or corrosive solvents and/or catalysts such as, e.g. glacial acetic acid and copper acetate are necessary which means that less apparatus is required and a more simple working up method is possible;

(b) The products formed are almost all monocyanoethylation products, i.e. according to the present process one cyanoethyl radical is introduced per amino group. This is of particular advantage when diamines, such as p-phenylenediamine, are used as uniform products are formed and not the usual mixtures of mono-, di-, tri- and tetra-cyanoethyl compounds obtained by other methods;

(c) The present process enables the cyanoethylation products to be produced in excellent yields. Particularly favourable is the process for the production of cyanoethylation products of easily oxidisable aromatic amines such as p-hydroxyaniline and p-phenylenediamine. Examples of amines which promote good yields (over 85%) are: aniline p-hydroxyaniline, p-methoxy-aniline, p-phenoxyaniline, 3,4-dimethylaniline, p-phenylaniline, p-phenylaminoaniline, p-phenylenediamine and benzidine.

In many cases, the reaction products according to the invention crystallise, if necessary after cooling the reaction mixture, in a very pure form. Liquid reaction products are separated from the aqueous phase, if necessary after salting out, and washed. If necessary they can be freed from traces of impurities by distillation under reduced pressure. In general, the yield of the cyanoethylation products produced by the process according to the invention is very high, in many cases it is almost quantitative. This is a considerable advance over the methods known to date.

The reaction products obtained according to the invention can be used, for example, as intermediate products in organic syntheses such as, e.g. for the production of bactericidal substances, antioxidants or dyestuffs. The cyanoethyl anilines are specially suitable as coupling components for the production of azo dyestuffs, particularly those for synthetic fibres such as rayon.

The present invention relates to an improved process for the production of a cyanoethylamino-substituted, maximally trihomocyclic aromatic compound with at most 12 ring carbon atoms by reaction of an amine which is either a primary or a secondary, either mono-, di- or tri-homocyclic aromatic amine with acrylonitrile, wherein the improvement resides in heating the reactants together in water in the presence, in the reaction medium, of a salt of the said aromatic amine with a strong mineral acid, as catalyst, to bring about reaction between said reactants. Heating is preferably carried out at the boiling point of the reaction medium.

Preferred strong mineral acids are hydrochloric acid, sulfuric acid and phosphoric acid.

The basicity of the amine should be at least substantially equal to that of aniline. The basicity can be as high as can be attained in the case of the above-defined aromatic amines. Especially the following primary mono-isocyclic arylamines are preferred because they render yields above 85%: aniline, p-hydroxyaniline, p-methoxyaniline, p-phenoxyaniline, 3,4-dimethylaniline, p-phenylaniline, p-phenylaminoaniline, p-phenylenediamine and benzidine.

The molar ratio of the aromatic amine usable according to the invention to that of its salts with the strong acid varies preferably between about 100:1 to 20:1. The aforesaid catalyst salt can be formed in situ by adding sufficient mineral acid to the reaction mixture to convert the necessary amount of the amine to its salt.

The following examples illustrate the invention. The temperatures are given therein in degrees centigrade.

*Example 1*

A mixture of 93 g. of aniline, 400 ml. of water, 3 ml. of 33% hydrochloric acid, 60 g. of acrylonitrile and 1 g. of hydroquinone is refluxed for 32 hours. The temperature raises from 80° to 96°. 50 g. of sodium chloride are then added to the resultant emulsion, it is cooled to 10–15° with stirring and seeded whereupon the oily phase crystallises. The crystals are filtered off and dried in vacuo. In this way, 138 g. (95% of the theoretical) of N-(2-cyanoethyl)-aniline are obtained. M.P. 48°.

In the same way, p-methylaniline, p-methoxyaniline, p-phenoxyaniline, m-methylaniline, p-phenylaniline or 3,4-dimethylaniline can be cyanoethylated.

Similar results are obtained if, instead of the 3 ml. of 33% hydrochloric acid, equivalent amounts of sulphuric acid, benzene sulphonic acid or p-toluene sulphonic acid are used and otherwise the procedure described in this example is followed.

*Example 2*

109 g. of p-hydroxyaniline in 350 ml. of water are refluxed for 4 hours with 1 ml. of phosphoric acid and 54 g. of acrylonitrile. After cooling, the reaction product crystallises out. After drying for 36 hours at 40–50°, 153 g. of N-(2-cyanoethyl)-p-aminophenol are obtained. M.P. 87°. The yield is 94.5% of the theoretical.

*Example 3*

648 g. of p-phenylenediamine and 18 ml. of 33% hydrochloric acid are dissolved in 3600 ml. of boiling water and 636 g. of acrylonitrile are added dropwise within half an hour at 85°. After boiling for 4 hours under reflux in an atmosphere of nitrogen, the reaction mixture is neutralised with sodium acetate and cooled to room temperature whereupon a precipitate is formed. This is filtered off and dried in vacuo. In this way 1185 g. (93% of the theoretical) of bis-N,N'-(2-cyanoethyl)-p-phenylenediamine are obtained. M.P. 142°.

In the same way, benzidine can be converted into the N,N'-bis-2-cyanoethyl compound.

*Example 4*

566 g. of p-phenylamino aniline are suspended in 3000 ml. of water and 45 ml. of concentrated hydrochloric acid (33%). To improve the distribution of the amine, 5 ml. of an ethylene oxide addition product with higher alkyl phenol are added as dispersing agent. 150 g. of acrylonitrile are added at 60° and the whole is refluxed for 21 hours. After 5 hours, a part begins to crystallise out of the reaction mixture. On completion of the reaction, the hydrochloric acid is neutralised with the equimolar amount of sodium hydroxide solution (44 ml. 10 N NaOH) and the mixture is cooled. After filtering and drying the residue in vacuo, 681 g. of 4-(2'-cyanoethylamino)-dyphenylamine (94% of the theoretical) are obtained. M.P. 135°. After recrystallisation from alcohol, the melting point is 138°.

*Example 5*

107 g. of N-methyl aniline, 350 ml. of water, 2.5 ml. of 33% hydrochloric acid and 56 g. of acrylonitrile are heated in an autoclave for 12 hours at 130–135° while stirring. The pressure rises to an excess of 4 atm. After cooling, the oily phase is separated and distilled. The N-(2-cyanoethyl)-N-methylaniline boils at 168–172°. 107 g. are obtained which corresponds to 68% of the theoretical.

N-(2-hydroxyethyl)-aniline or N-butyl aniline can be cyanoethylated in the same way. In all three cases an equivalent amount of sulphuric acid can be used instead of hydrochloric acid.

*Example 6*

123 g. of o-methoxyaniline in 350 ml. of water are refluxed for 42 hours with 56 g. of acrylonitrile and 2.5 ml. of concentrated hydrochloric acid (35%) with the addition of 1 g. of alkyl sulphonate. The reflux temperature rises from 82 to 94° C. The mixture is then neutralised with sodium hydroxide solution, the organic phase is separated and distilled under vacuum. 104 g. of N-(2-cyanoethyl)-o-methoxy-aniline (60% of the theoretical yield) are obtained. B.P.$_{11}$ 190–193°.

o-Methylaniline, p-tert. butylaniline, p-dimethylamino-aniline, p-acetylaminoaniline, p-cyclohexylamine, p-ethoxyaniline, o-hydroxyaniline, 1-naphthylamine, 5-aminoacenaphthene can be cyanoethylated in the same way.

If, in the above example, double the amount of acrylonitrile is used, and, instead of methoxyaniline, equivalent amounts of o-dianisidine, p,p′-diaminodiphenylmethane or p,p′-diaminodiphenylamine are used, then the corresponding N,N′-dicyanoethylamino compounds are obtained.

Example 7

Corresponding to Example 1, the test conditions were varied: the following results were obtained

| Test | Solvent | Catalyst, mol percent | Remarks | Yield, Percent |
| --- | --- | --- | --- | --- |
| 1 | Water | Anilinium chloride 3% | Obtained direct as crystals (same as example 1). | 95 |
| 2 | do | None | Obtained as greasy crystal mass, must be distilled. After distillation 67%. | 73 |
| 3 | do | Anilinium acetate 3% | do | 73 |
| 4 | 80% by vol. ethanol 20% by vol. water. | Anilinium chloride 3% | Remains in solution. After distillation of solvent, distillation of product is necessary. | 40 |
| 5 | do | None | do | 35 |

It can be seen from these tests that the process according to the invention is more simple to work and produces unexpectedly high yields while avoiding undesirable, complicated preparatory steps. This is particularly surprising as the use of aniline salt with weak acids such as, e.g. acetic acid, as catalyst leads to no improvement whatever compared with tests with water alone.

What is claimed is:

1. In a process for the production of a cyanoethyl-amino-substituted, maximally tri-carbocyclic aromatic compound with at most 12 ring atoms by reaction of an amine selected from the group consisting of a primary and a secondary maximally tricarbocyclic aromatic amine with acrylonitrile, the improvement which consists essentially of heating the reactants together in a reaction medium consisting essentially of water in the presence, in said medium, of a strong mineral acid salt of the said amine, the molar ratio of the aromatic amine to that of the strong mineral acid salt of the amine being within the range of 500:1 to 10:1.

2. The improvement described in claim 1, wherein said strong mineral acid is selected from the group consisting of hydrochloric acid, sulfuric acid and phosphoric acid.

3. The improvement described in claim 1, wherein said amine has a basicity which is at least substantially equal to that of aniline.

4. The improvement described in claim 1, wherein the reaction medium consists of at least about 75% of water, 5. In a process for the production of N-(2-cyanoethyl)-aniline by reaction of aniline with acrylonitrile, the improvement which comprises heating the reactants together in water in the presence, in the reaction medium, of the hydrochloric acid salt of aniline, the molar ratio of aniline to the hydrochloric acid salt of aniline being within the range of 500:1 to 10:1.

6. In a process for the production of N-(2-cyanoethyl)-p-aminophenol by reaction of p-hydroxyaniline with acrylonitrile, the improvement which comprises heating the reactants together in water in the presence, in the reaction medium, of the phosphoric acid salt of p-hydroxyaniline, the molar ratio of p-hydroxyaniline to the phosphoric acid salt of p-hydroxyaniline being within the range of 500:1 to 10:1.

7. In a process for the production of bis-N,N′-(2-cyanoethyl)-p-phenylenediamine by reaction of p-phenylenediamine with acrylonitrile, the improvement which comprises heating the reactants together in water in the presence, in the reaction medium, of the hydrochloric acid salt of p-phenylenediamine, the molar ratio of p-phenylenediamine to the hydrochloric acid salt of p-phenylenediamine being within the range of 500:1 to 10:1.

8. In a process for the production of 4-(2′-cyanoethylamino)-diphenylamine by reaction of p-phenylaminoaniline with acrylonitrile, the improvement which comprises heating the reactants together in water in the presence, in the reaction medium, of the hydrochloric acid salt of p-phenylamino-aniline, the molar ratio of p-phenylamino-aniline to the hydrochloric acid salt of p-phenylamino-aniline being within the range of 500:1 to 10:1.

9. In a process for the production of N-(2-cyanoethyl)-N-methylaniline by reaction of N-methylaniline with acrylonitrile, the improvement which comprises heating the reactants together in water in the presence, in the reaction medium, of the sulfuric acid salt of N-methylaniline, the molar ratio of N-methylaniline to the sulfuric acid salt of N-methylaniline being within the range of 500:1 to 10:1.

References Cited by the Examiner

UNITED STATES PATENTS 2,726,945   12/1955   Heininger _____ 260—465 X

OTHER REFERENCES

Bekhli et al.: Chemical Abstracts, 1950, vol. 44, p. 3448.

CHARLES B. PARKER, *Primary Examiner.*